C. R. PATTERSON.

PLANING-MACHINE.

No. 7,545. Reissued March 6, 1877.

WITNESSES:

Jas. E. Hutchinson.

P. E. Wilson.

INVENTOR.

Chester R. Patterson

N. PETERS, PHOTO-LITHOGRAPHER, WASHINGTON, D. C.

UNITED STATES PATENT OFFICE.

CHESTER R. PATTERSON, OF PITTSTON, PENNSYLVANIA.

IMPROVEMENT IN PLANING-MACHINES.

Specification forming part of Letters Patent No. 163,802, dated May 25, 1875; reissue No. 7,545, dated March 6, 1877; application filed February 23, 1877.

*To all whom it may concern:*

Be it known that I, CHESTER R. PATTERSON, of Pittston, in the county of Luzerne and the State of Pennsylvania, have invented a new and useful Improvement in Planing-Machines, which improvement is fully set forth in the following specification and accompanying drawing, in which—

Figure 1:
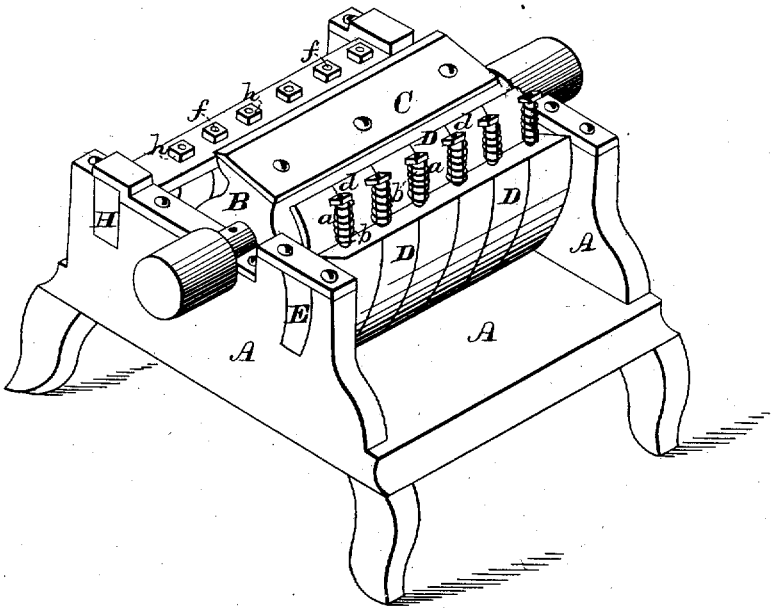
Figure 2:
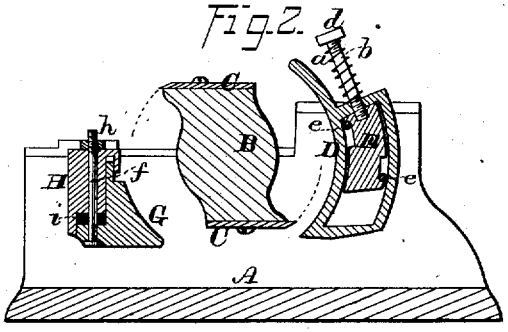

Figure 1 is a perspective view, showing the pressure-block in position. Fig. 2 is a longitudinal vertical section of the same.

The nature of my invention consists in a series of independent pressure-blocks, provided with anti-friction rollers, arranged on lines parallel with the axis of the rotating cutter, and also in the construction and combination of parts, as will be hereinafter set forth.

A represents the frame of the machine; B, the cutter-head; C C, the cutters. E is a stationary guide or cross-bar, to which is hung a series of independent pressure-blocks or chip-breakers, D D, provided with anti-friction rollers *e e*, which enable the blocks to work with ease. The blocks are given the proper amount of pressure by the spring *a*. In the rear of the cutter-head B is a stationary arm or cross-bar, H, to which a series of pressure-blocks, G, are hung by means of the bolt *f*, each block having the proper amount of pressure given it by the spring *i*, the object of which is to enable the operator to plane two boards at once, or to plane one board at the side of the machine without vibration, or to hold the thin edge of an unevenly-sawed board, thus doing better work than can be done with the pressure bars or rollers, and enabling the operator to wear the knives and bed of the machine evenly or level.

Having thus fully described my invention, what I claim as new, and wish to secure by Letters Patent, is—

1. A series of independent pressure-blocks, D D, provided with anti-friction rollers, substantially as shown and described.

2. Two series of independent pressure-blocks, D and G, in combination with a rotating cutter-head, substantially in the manner and for the purpose shown and described.

CHESTER R. PATTERSON.

Witnesses:

THOMAS C. CONNOLLY,

B. H. WEST.